Jan. 20, 1925.  
K. R. MARKS  
AUTOMOBILE  
Filed Aug. 12, 1922  
1,523,784  
3 Sheets-Sheet 3
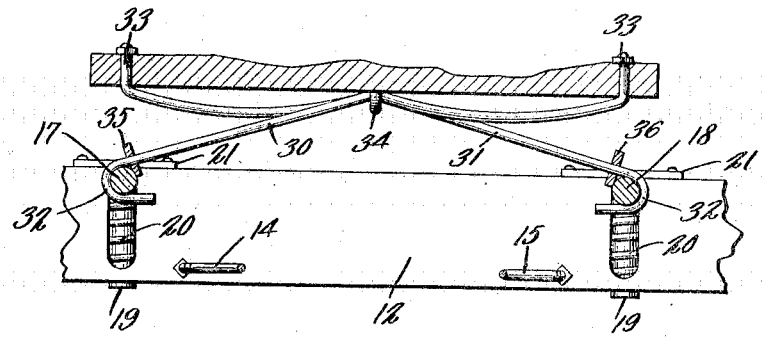
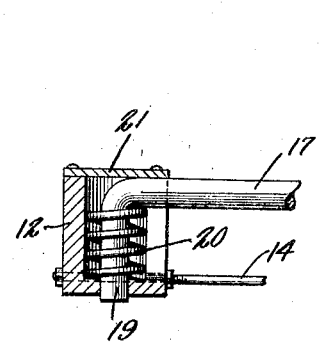
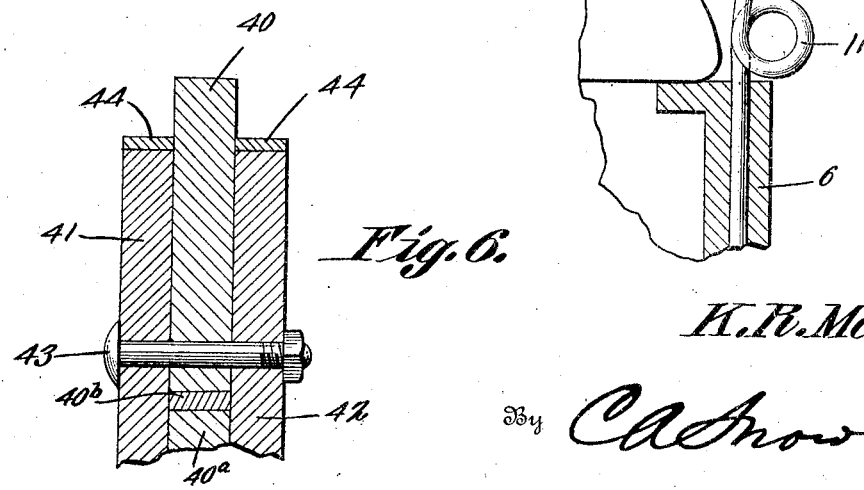

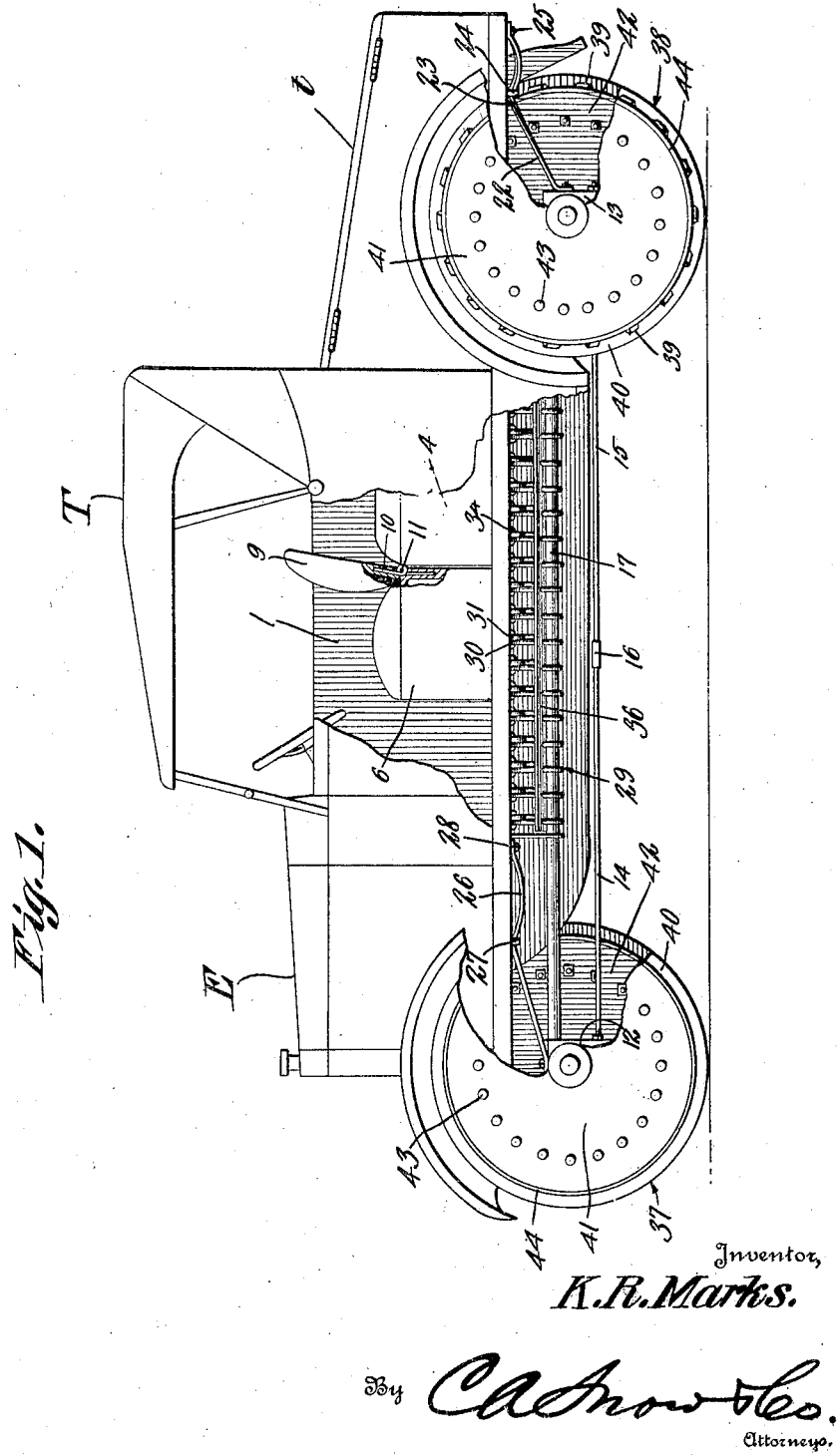

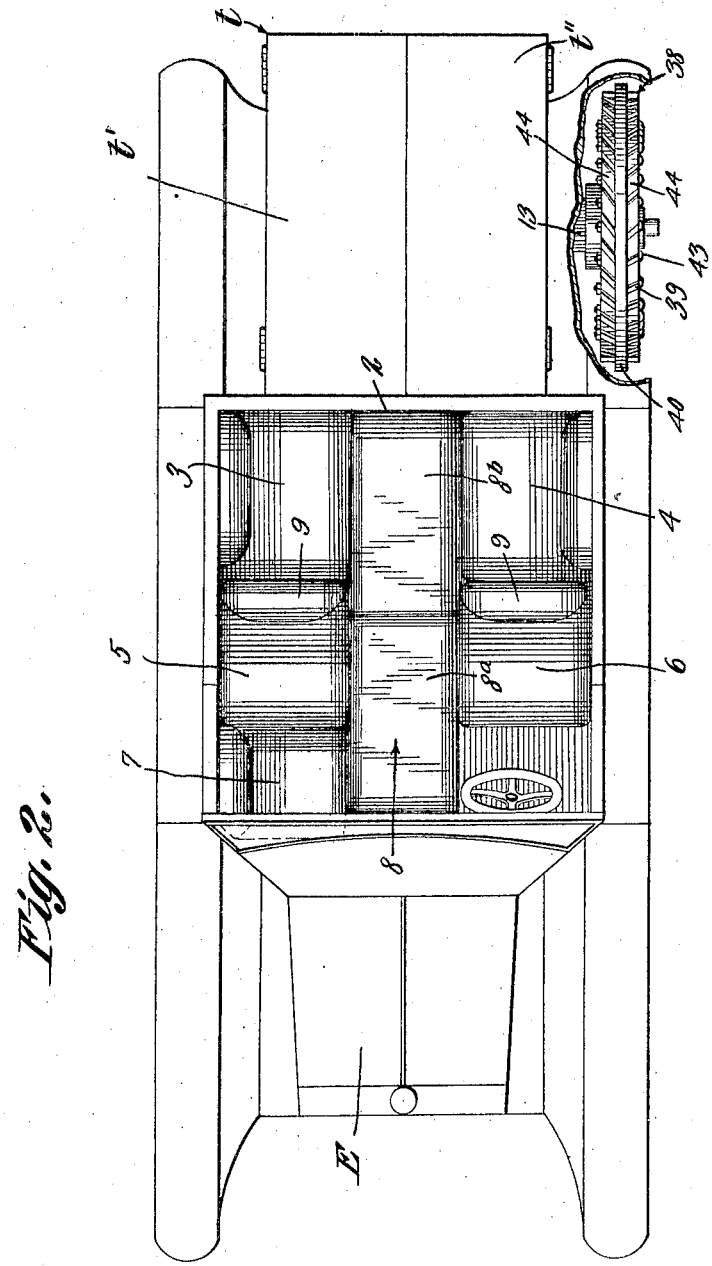

Patented Jan. 20, 1925.

1,523,784

UNITED STATES PATENT OFFICE.

KNOX R. MARKS, OF CASPER, WYOMING.

AUTOMOBILE.

Application filed August 12, 1922. Serial No. 581,451.

*To all whom it may concern:*

Be it known that I, KNOX R. MARKS, a citizen of the United States, residing at Casper, in the county of Natrona and State of Wyoming, have invented a new and useful Automobile, of which the following is a specification.

This invention relates to automobiles, and more particularly to the bodies thereof and their mounting on the chassis.

The object of the invention is to provide an automobile body of the chummy roadster type, which while comfortably seating five persons will yet present an attractive, compact, neat appearance.

Another object is to provide supporting springs mounted between the body and chassis of the car in which there will be no friction, and which will absorb all shocks.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of an automobile constructed in accordance with this invention with parts broken out and in section.

Fig. 2 is a top plan view thereof with the top removed and with a portion of the rear mud guard broken away to disclose the construction of one of the rear wheels.

Fig. 3 is a transverse section showing the connecting springs between the body and the chassis.

Fig. 4 is a detail vertical section showing one of the shock absorbing springs.

Fig. 5 is an enlarged detail vertical section through one of the seats showing the removable back therefor, and Fig. 6 is an enlarged detail sectional view of a portion of the wheel.

In the embodiment illustrated, the automobile embodying this invention is made in the form of a chummy roadster, the body of which includes a seat compartment 1 having the usual top T with the engine E in front thereof and which may be of any desired construction, and a tonneau *t* at the rear thereof which is equipped with hinged closures *t'* and *t"* which open outwardly to provide for the insertion of large articles in the tonneau.

The body proper or seat compartment 1 has an aisle 2 extending longitudinally thereof with seats 3 and 4 arranged on each side of the aisle at the rear end thereof, and with front seats 5 and 6 at the front end of the aisle, with a folding chair 7 removably mounted between chairs 6 and 5.

The front seats 5 and 6 are equipped with spring backs, shown in detail in Fig. 5 said backs being removable so that when desired, the seats 3 and 5 and 4 and 6 may be used as beds.

The removable backs 9 are shown supported by springs 10 formed of heavy pieces of wire with one end inserted in the back 9 and the other in the back portion of the seat in connection with which it is to be used, having a coiled spring 11 arranged between the lower edge of the back 9 and the upper edge of the seat proper, as is shown clearly in Fig. 5.

This arrangement of supporting springs provides for swinging of the back to and fro, as well as for its removal which is accomplished by lifting out the springs from the seat proper.

The seats 3 and 4 may be of any suitable or desired construction and equipped with permanent or removable backs.

An upholstered board 8 of a width to fit the aisle and of a length to extend from end to end of the body as shown in Fig. 2 is designed to be positioned in the aisle and suitably supported between the series of side seats, the folding seat 7 being first removed and placed in front of seat 5 as shown in Fig. 2, so that two persons may sleep while another drives.

This board is preferably constructed of two hingedly connected sections 8ª and 8ᵇ to be folded and stored in the tonneau when not in use.

The body of the car is suported by axles 12 and 13 arranged at the front and rear thereof, which are connected by crossed rods 14 and 15 which are united at their points of intersection as shown at 16 by welding or otherwise. These rods extend through the axles and are secured at the front and rear of said axles by nuts as is shown clearly in Fig. 4.

Side bars or rods 17 and 18 have their opposite ends bent downwardly at right angles, as shown at 19, said ends being housed in the axles 12 and 13 and supported by coiled springs as 20, which encircle said ends and bear against the body of the rod 17 and the axle as shown clearly in Fig. 4, and which operate as shock absorbers, especially designed to take care of heavy loads. The axles 12 and 13 are socketed to receive these rod ends 19, and said sockets are covered by plates as 21 secured in any suitable manner to the axles as is shown clearly in Fig. 4.

The rear end of the car is also additionally supported by springs 22 and 23 shown at the right of Fig. 1, which are attached at one end to the axle 13 and cross each other midway their length, being secured at their points of intersection to the lower face of the car body by keepers 24, the other ends of said springs being bolted or otherwise secured to the car body, as is shown at 25 in Fig. 1.

Additional supporting springs 26 connect the front axle 12 with the car body, being secured at one end to said axle, as shown in Fig. 1, and passing through keepers as 27 depending from the lower face of the car body and then bowed outwardly and secured at their inner ends to the car body as shown at 28. While one only of these springs 26 is shown, it is to be understood that another is arranged at the opposite side of the car and is constructed exactly like that shown in Fig. 1.

A plurality of pairs of springs 29 connect the side rods 17 and 18 with the body of the car at intervals throughout the length of the car body extending as near each end of the car as possible. Each pair of springs comprises two metal rods 30 and 31 which may be either flat or round, each of which has a hook 32 at one end and a laterally extending finger 33 at its other end. The hooks of the springs 30 and 31 engage the side rods 17 and 18. These springs 30 and 31 of each pair intersect midway their length and pass at such points of said intersection through keepers 34 depending from the lower face of the car body, while the finger carrying ends of said springs extend upwardly and are inserted through opposite sides of the bottom of the car body, as is shown clearly in Fig. 3.

The hooked ends of the springs pass through apertured plates or bars 35 and 36 arranged adjacent the side bars 17 and 18, said bars operating as spacers for the springs and to hold them in operative position predetermined distances apart.

The front wheels 37 and the rear wheels 38 are similarly constructed, except that the rear wheels 38 are provided with obliquely arranged traction cleats 39 positioned on opposite sides of a centrally disposed solid rubber tire 40 carried by the periphery of the wheel. As shown, these wheels are constructed of wooden cores $40^a$ with a solid rubber tire 40 mounted thereon and having a band $40^b$ arranged between the core and tire to compensate for stretching of the tire. Metal disks 41 and 42 are arranged on opposite sides of the wheel and secured together and to the tire by bolts 43, any desired number of which may be employed sufficient to hold the disks rigidly connected and to adapt them to receive the strains to which they will be subjected. These wheels are preferably equipped with metal tires 44, beyond which extend the solid rubber tire 40, above described.

From the above description it will be obvious that a car constructed as herein shown and described will not only present a neat attractive appearance, but will be extremely comfortable owing to the peculiar mounting of the body on the chassis.

I claim:—

1. In an automobile, a body and a chassis, laterally spaced longitudinally extending bars carried by the chassis, spring rods arranged in pairs and connecting said body with said bars, the rods of each pair intersecting each other midway their length below said body, and each having a hook at one end to engage one of the bars, and means at the other end for engaging said body.

2. In an automobile, a body and a chassis, a plurality of longitudinally spaced transversely extending springs arranged between said body and chassis, means carried by the chassis for supporting said springs, said springs being in the form of pairs of strong metal rods, each having a hook at one end and a finger at the other, the hooks being designed for engagement with said chassis carried supporting means and the fingers with the body, and keepers connecting said rods to said body at their points of intersection.

3. In an automobile, a body and a chassis, laterally spaced longitudinally extending bars carried by the chassis, axles at the front and rear of said chassis, said bars having their ends bent downwardly at right angles, said axles having sockets to receive said bent ends, coiled springs on said ends to act as shock absorbers, and transversely arranged springs connected with said bars and with said body.

4. In an automobile, a body and a chassis, laterally spaced longitudinally extending bars carried by the chassis, axles at the front and rear of said chassis, said bars having their ends bent downwardly at right angles, said axles having sockets to receive said bent ends, and coiled springs on said ends to act as shock absorbers, the springs connecting said bars with the body of the vehicle intermediate their ends.

5. In an automobile, a body and a chassis, laterally spaced longitudinaly extending bars carried by the chassis, axles at the front and rear of said chassis, said bars having their ends bent downwardly at right angles, said axles having sockets to receive said bent ends, coiled springs on said ends to act as shock absorbers, transversely arranged rods connecting said bars and body, said rods each having a hook at one end and a finger at the other, the hook engaged with the bar at one side of the vehicle and the finger with the body at the other side thereof, said bars being arranged in pairs those in each pair intersecting midway their length, and keepers depending from the vehicle body through which the pairs of rods extend at their points of intersection.

In testimony that I claim the foregoing as my own, I have hereto affixed my signature in the presence of two witnesses.

KNOX R. MARKS.

Witnesses:
MARTHA W. MARKS,
ZOE MARKS.